United States Patent [19]

Hardy et al.

[11] Patent Number: 5,341,427

[45] Date of Patent: * Aug. 23, 1994

[54] ALGORITHM INDEPENDENT CRYPTOGRAPHIC KEY MANAGEMENT APPARATUS

[75] Inventors: Douglas A. Hardy, Mesa; Leslie K. Lewis; Barry N. Altschuler, both of Scottsdale, all of Ariz.

[73] Assignee: Motorola, Inc., Schaumburg, Ill.

[ * ] Notice: The portion of the term of this patent subsequent to Jun. 12, 2010 has been disclaimed.

[21] Appl. No.: 52,438

[22] Filed: Apr. 23, 1993

Related U.S. Application Data

[62] Division of Ser. No. 954,205, Sep. 30, 1992, Pat. No. 5,230,020, which is a division of Ser. No. 777,870, Oct. 16, 1991, Pat. No. 5,179,591.

[51] Int. Cl.⁵ .................................. H04L 9/08
[52] U.S. Cl. ...................... 380/21; 380/46; 380/49
[58] Field of Search .................. 380/21, 46, 49, 50

[56] References Cited

U.S. PATENT DOCUMENTS

| | | | |
|---|---|---|---|
| 4,193,131 | 3/1980 | Lennon | 375/2 |
| 4,274,085 | 6/1981 | Marino, Jr. | 340/347 |
| 4,365,110 | 12/1982 | Lee et al. | 178/22.10 |
| 4,399,323 | 8/1983 | Henry | 178/22.14 |
| 4,484,025 | 11/1984 | Ostermann et al. | 178/22.09 |
| 4,484,027 | 11/1984 | Lee et al. | 178/22.13 |
| 4,888,801 | 12/1989 | Foster et al. | 380/21 |
| 4,941,176 | 7/1991 | Matyas et al. | 380/21 |
| 5,073,934 | 12/1991 | Matyas et al. | 380/49 |
| 5,086,467 | 2/1992 | Malek | 380/6 |
| 5,142,578 | 8/1992 | Matyas et al. | 380/21 |
| 5,144,667 | 9/1992 | Pogue, Jr. et al. | 380/45 |
| 5,179,591 | 1/1993 | Hardy et al. | 380/21 |
| 5,199,069 | 3/1993 | Barrett et al. | 380/21 |
| 5,230,020 | 7/1993 | Hardy et al. | 380/21 |

OTHER PUBLICATIONS

An Article entitled "Data Encryption Standard", U.S. Department of Commerce, National Bureau of Standards Publication, Jan. 15, 1977, Reaffirmed Jan. 22, 1988.

An Article entitled "Des Modes of Operation", U.S. Department of Commerce, National Bureau of Standards Publication, Dec. 2, 1980.

Primary Examiner—Salvatore Cangialosi
Attorney, Agent, or Firm—Frederick M. Fliegel

[57] ABSTRACT

An apparatus for secure communications contains a controller for automatically selecting one of several data ciphering devices utilizing one of a plurality of ciphering algorithms common to transmitting and receiving terminals. A transmitter for transmitting encrypted data, and a receiver for receiving encrypted data are coupled to the plurality of ciphering devices. The controller automatically determines which of the ciphering devices to employ for any given secure communication. The method for establishing a secure communications link includes the steps of exchanging a first message for determining a common key generation and ciphering method and comparing a further shared message for validation of communications terminal security. Additionally, the steps of trading a still further message for providing data to form traffic keys to initialize key generators, interchanging an additional message for synchronizing and verifying synchronization of secure communications between secure communications terminals, and initiating secure communication are used.

18 Claims, 4 Drawing Sheets

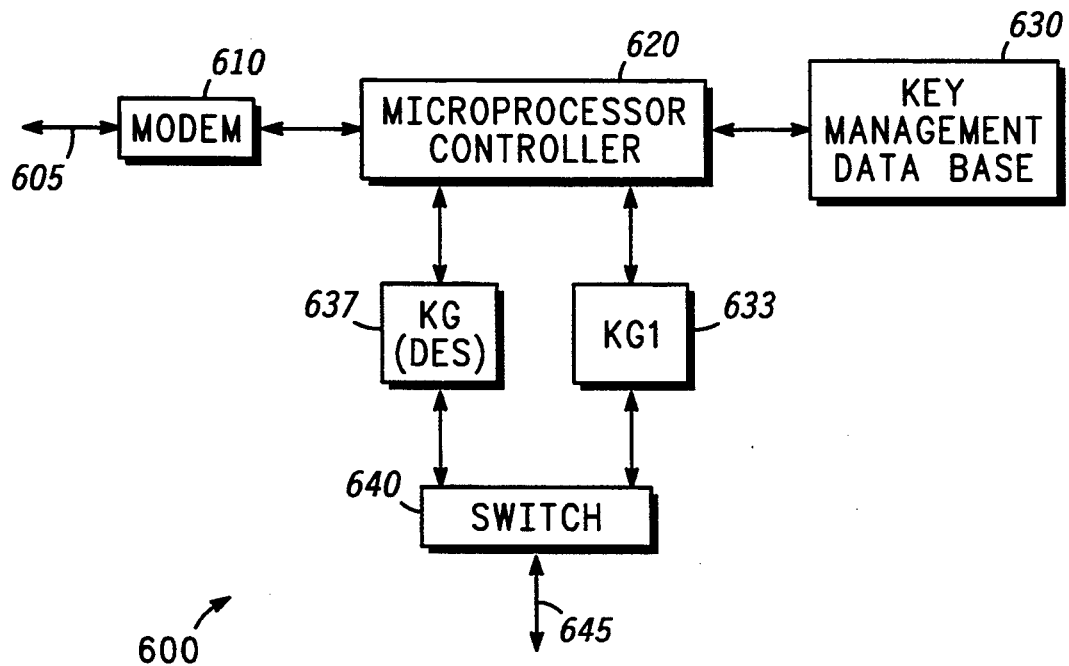
FIG. 6
FIG. 7
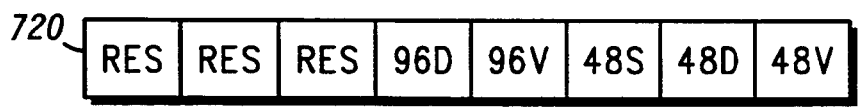

ALGORITHM INDEPENDENT CRYPTOGRAPHIC KEY MANAGEMENT APPARATUS

The portions of the term of this patent subsequent to Jan. 12, 2010 and Jul. 20, 2010 have been disclaimed.

CROSS-REFERENCE TO RELATED APPLICATIONS

This patent is a divisional of U.S. patent application Ser. No. 07/954,205 filed on Sep. 30, 1992, now U.S. Pat. No. 5,230,020, which is a divisional of prior U.S. patent application Ser. No. 07/777,870 filed on Oct. 16, 1991, now U.S. Pat. No. 5,179,591.

FIELD OF THE INVENTION

The present invention concerns an improved means and method for secure communication and, more particularly, secure communication between varying types of user equipments employing differing cryptographic algorithms and/or cipher keys.

BACKGROUND OF THE INVENTION

A broad variety of cryptographic techniques and corresponding apparatus have been developed to meet increasing needs for secure communications among civilian and military users. These needs are fostered by increasingly stringent security requirements for industrial, financial, government, police, subscriber media, and other commercial and civil endeavors wherein unauthorized data interception would cause harm to the public good or to private business interests.

Typical encrypted data includes computer-based records, telephone conversations and other voice data, telemetry, facsimile transmissions, earth-satellite and satellite-satellite communications from a variety of sources including the Global Positioning System, and subscriber information distribution systems. Motivations for encrypting data include improved signal to noise ratio by promoting a more even data mix (e.g., transmitting an encrypted, balanced mixture of "ones" and "zeroes" rather than an unbalanced, non-encrypted string of "ones" or "zeroes"), enforcement of subscription fees, privacy of privileged conversation, national security concerns, and maintenance of financial transaction integrity for both prevention of computer-based crimes and to provide convincing assurance of confidentiality and user authorization.

Improved sophistication in intelligence surveillance and code-breaking methods have motivated the creation of new ciphering algorithms and corresponding equipments. By way of example and not intended to be limiting, several classes of cryptographic methods currently in broad use include the Data Encryption Standard (DES), as described in Federal Information Processing Standards Publications FIPS 46-1, "Data Encryption Standard," and FIPS 81, "DES Modes of Operation," both published by the United States Department of Commerce, Public Key cryptographic techniques such as that taught in. "Fast Real-Time Public Key Cryptography," U.S. Pat. No. 4,399,323, to Paul S. Henry, and "Multiple-Destinational Cryptosystem for Broadcast Networks," U.S. Pat. No. 4,365,110, to Lin-Nan Lee and Shyue-Ching Lu. The above-identified U.S. Patents are included herein by reference.

An element common to these diverse cryptographic devices and algorithms is the need for authorized senders and receivers to share cipher key information of some form enabling encryption and subsequent decryption of the intended message.

A disadvantage of prior art public-key cryptographic systems for secure communications such as telephony is that public-key data encryption and decryption is a very slow process. Accordingly, public-key cryptography is often used to transmit small amounts of information, such as a traffic key for a more rapid cryptographic technique, in a secure fashion over a public transmission medium, such as a radio channel or a telephone line.

Encryption methods for real-time bidirectional communication include a variety of ciphering techniques such as those disclosed in FIPS 46-1 and 81, supra, and other techniques developed by companies supplying such apparatus. These methods are capable of providing excellent data integrity provided that both parties have or have access to suitable traffic keys for data ciphering. Typically these methods operate on blocks of digital data formed from input data of varying digital or analog form.

Sometimes multiple communication channels must be used, as for example when more than a single sender and receiver are involved, either serially or in parallel. Frequently, not all users have identical equipment or identical cryptographic keys or algorithms. Under these circumstances, redundant equipments differing in cipher keys or cryptographic algorithms and-devices may well be needed at each sending or receiving site. This results in increased communication equipment needs and expenses. Further, where the type of communications equipment must be mobile or portable, the power requirements, weight, and large size necessary to accommodate multiple, separate secure communications systems are unacceptable.

Even when a single communications terminal accommodates multiple ciphering techniques, user knowledge of the other party's capabilities, and manual user selection of suitable secure communications apparatus may be required. This can compromise communications security by increasing user knowledge of the details of the security algorithm and hardware employed, by spreading of authorized user information over a broader number of individuals, and by increasing user involvement in the detailed arrangements required to initiate secure communication. This increases the risk of error in effecting secure communications links.

What is needed is a means for rapid real-time secure communications which accommodates multiple ciphering algorithms and cipher keys in a single apparatus, so that authorized, self-synchronizing communications can be established and maintained between diverse parties. It is further desirable that the apparatus be compact, light weight and have low power requirements.

SUMMARY OF THE INVENTION

According to the present invention, a novel method and apparatus for effecting cryptographic communication between diverse ciphering systems are disclosed.

A method for establishing a secure communications link includes the steps of exchanging a first message containing information on encryption devices and communications modes available within the terminals, selecting in at least one terminal a common key generation and ciphering method and a common data rate, exchanging a second message containing user authentication information, exchanging a third message for providing data to form traffic keys, exchanging a fourth message for synchronizing secure communications, and initiating secure communication.

An apparatus for secure communications includes a plurality of data ciphering means utilizing different ciphering algorithms, a transmitting means for transmitting encrypted data, the transmitting means coupled to the plurality of ciphering means, a receiving means for receiving encrypted data, the receiving means coupled to the plurality of ciphering means, and a control means for automatically determining which of the plurality of ciphering means to employ for any given secure communication.

The above and other features and advantages of the present invention will be better understood from the following detailed description taken in conjunction with the accompanying drawings.

BRIEF DESCRIPTION OF THE DRAWING

FIG. 6 illustrates a schematic example of a secure communications terminal in accordance with the preferred embodiment of the present invention; and FIG. 7 illustrates the assignment of bits representing key generating capabilities in a message exchanged between transmitting and receiving terminals in accordance with the preferred embodiment of the present invention.

DESCRIPTION OF THE PREFERRED EMBODIMENT

As used herein the words "encryption", "enciphering" and "encoding" mean conversion of a plain-text message to a secure message, while "decryption", "deciphering" and "decoding" refer to the inverse of this process.

Figure 1:
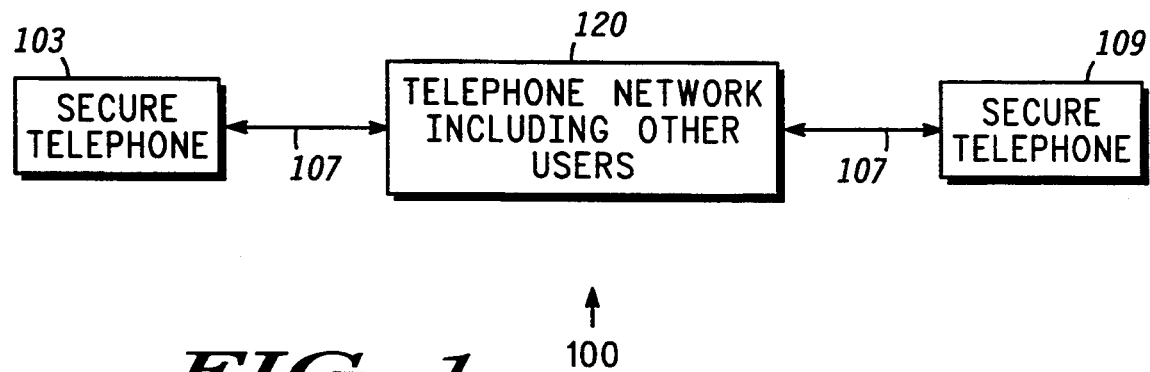
FIG. 1 is a schematic diagram of a secure communication system using the public telephone system in accordance with the present invention.

FIG. 1 illustrates secure communication system 100, comprising telephone network 120, telephone lines 107, and secure communications terminals 103, 109, as for example, secure telephones. In operation, voice data are digitized in one of secure communications terminals 103, 109. As used herein, the words "telephone" or "communications terminal" are intended to include any device for transmitting information including but not limited to audio information, facsimile, video, computer data, graphic data and combinations thereof, and the words "voice" or "data" or "voice data" are intended to include these and all other types of transmissible information.

Input data are encrypted in terminal 103 or 109 and subsequently transmitted via telephone lines 107 and telephone network 120 to, for example, another of secure communications terminal 109 or 103, wherein the encryption and digitizing processes are reversed, providing plain-text data equivalent to the original input data. Alternative transmission media, such as radio links, packet-switched data networks, dedicated lines or other communications channels are usefully employed in lieu of telephone lines 107 and telephone network 120. Modems, which can be external or internal to secure communications terminals 103, 109, are conventionally employed for communicating digital data streams over telephone lines or other communications links.

The present invention overcomes the problems of the prior art by providing within one or both of terminals 103, 109 a means and method for encrypting and decrypting messages according to one of several possible protocols that both terminals can understand so that terminals of differing characteristics and protocols can talk to each other. In a preferred embodiment, the protocol select ion is automatic and transparent to the user. A preferred hierarchy of protocols is desirably included. In this way the invented multi-protocol terminal can communicate with other non-identical terminals.

Figure 2:
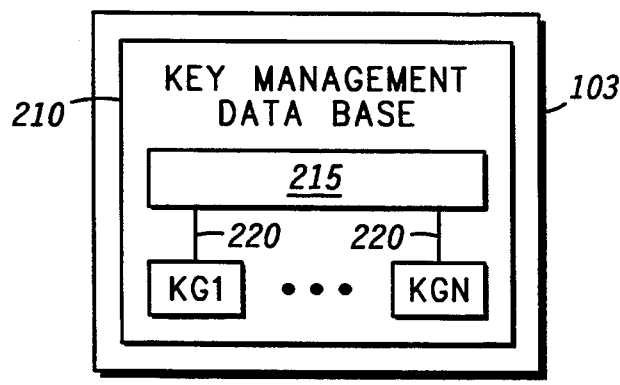
FIG. 2 is a schematic diagram of a key management data base in accordance with the present invention.

FIG. 2 is a schematic example of key management data base 210 within secure communications terminal 103 (and/or 109) wherein multiple ciphering keys and devices KG1–KGN are organized. KG1–KGN are devices which provide encryption/decryption of messages according to one of N predetermined algorithms using keys appropriate to the particular algorithm chosen. Control means 215 are coupled to the multiple ciphering keys and devices KG1–KGN by means of interconnections 220, allowing a particular ciphering algorithm to be selectively employed in accordance with control means 215. Each secure communication terminal 103, 109 can contain a pair of key management data bases 210, one dedicated to encrypting and transmitting information and the other dedicated to receiving and decrypting information. A single key management database 210 can also serve both functions and is preferred. Only one of the two (or more) communications terminals 103, 109 need have multiple ciphering keys and devices KG1–KGN. The other terminal need have only one of those found in the multi-device terminal.

Before secure communications can begin, terminals 103, 109 must be initialized. According to a preferred embodiment of the present invention initialization proceeds in one of two modes, the manual key management mode or the public key management mode. The public key management mode avoids the inconvenience of physically transporting (e.g., hand carrying) a unique pair of cipher keys specific to the particular communication to the secure communications terminals. Cipher key certification methods are described, for example, in commonly assigned U.S. Pat. No. 4,888,801, entitled "Hierarchical key management system" and issued Dec. 19, 1989 and which is incorporated herein in its entirety by reference.

Figure 3:
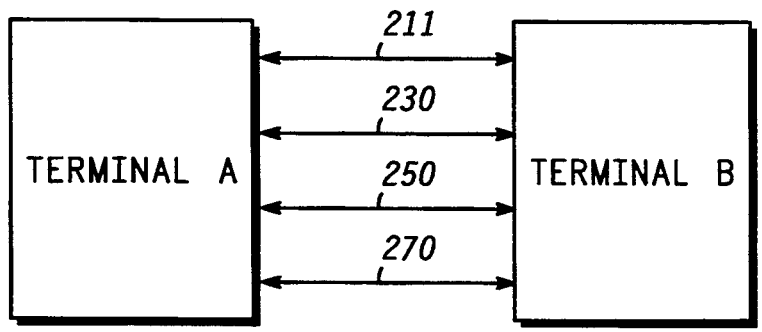
FIG. 3 is an illustration of a portion of the message sequence for initiating secure communication in accordance with the present invention.

FIG. 3 is an illustration of a portion of a message sequence for automatically initiating secure communication between terminals A and B (e.g., terminals 103, 109) in the public key mode in accordance with the present invention. As schematically illustrated in FIG. 3, the public key management mode involves exchange of four messages, identified as (i) Access Domain and Capabilities (AD&C) Message 211, (ii) Authentication Message (AM) 230, (iii) Random Component Message (RCM) 250, and (iv) Cryptographic Synchronization (CS) Message 270. Each of these messages is desirably of a predetermined length comprising a series of bytes. Each byte desirably contains information of a specific type (e.g., available encryption devices, modem type, et cetera) and the complete message is formed, for example, by concatenating the appropriate group of bytes to form the message.

Figure 4:
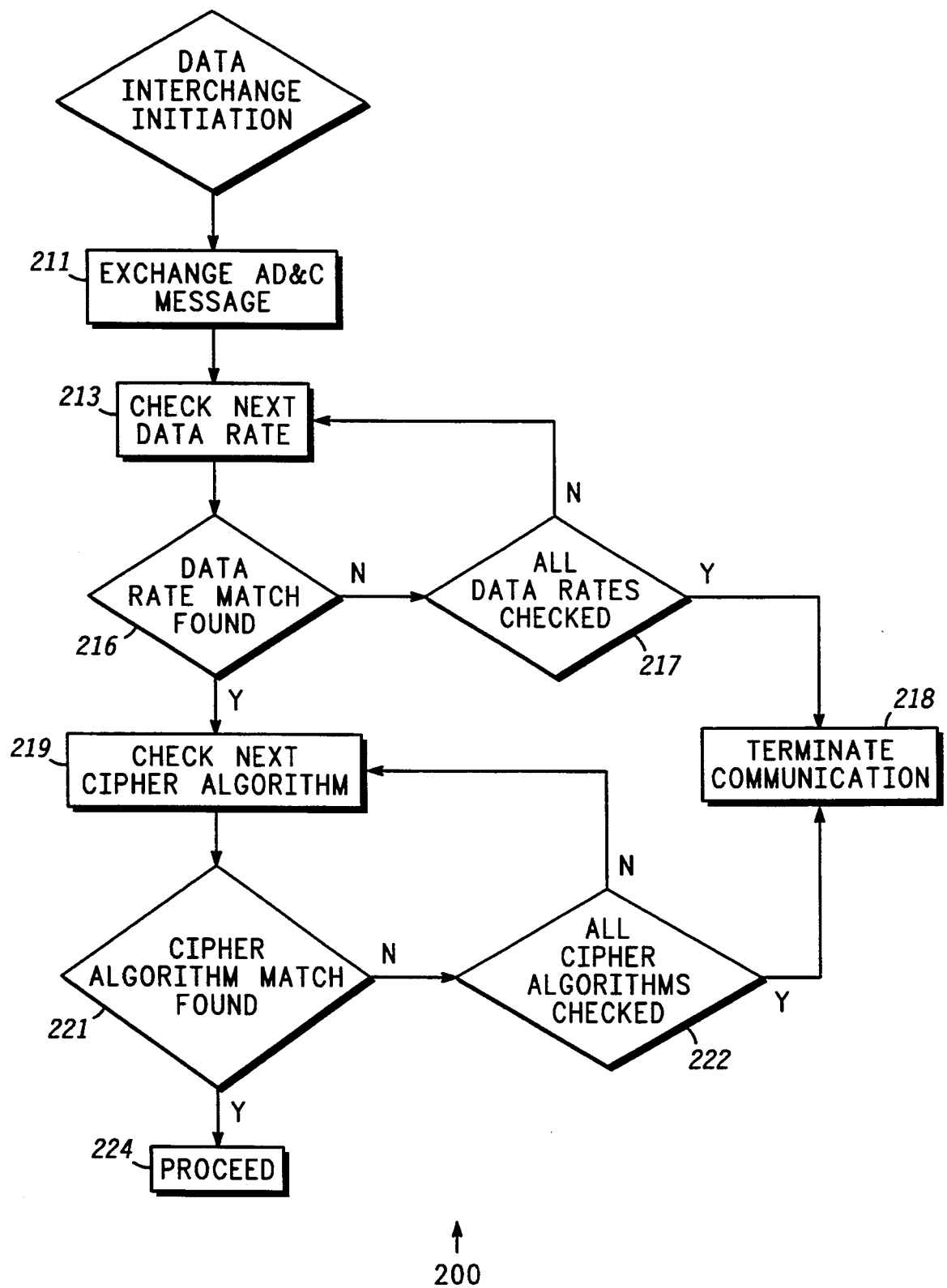
FIG. 4 is a flow chart illustrating the data rate and cipher algorithm matching process in accordance with a preferred embodiment of the present invention.

Access Domain and Capabilities (AD&C) Message 211 in this case provides: choice of key management mode, choice of key generator (KG) algorithm selected, certification authority for the terminal, and any additional terminal capabilities (e.g., data rate). FIG. 4 is a flow chart illustrating method 200 by which AD&C Message 211 of FIG. 3 is used to establish data rate and cipher algorithm matching in accordance with the present invention.

Method 200 illustrated in FIG. 4 comprises the steps of exchanging Access Domain and Capabilities (AD&C) Messages in block 211, an iterative loop 213, 216, 217, including the steps of checking a next data rate 213, decision step 216 for determining if a suitable data rate has been identified, verifying whether or not all data rates have been checked 217, proceeding to loop 219, 221, 222 when decision step 216 locates a data rate match, or terminating communication 218 if all data rates have been checked without finding a match. Loop 219, 221, 222, includes the steps of checking a next cipher algorithm 219, decision step 221 for determining if a suitable cipher algorithm has been identified (i.e., one common to both terminals), and verifying 222 that all cipher algorithms have been checked, followed by a step of proceeding 224 when decision Step 221 locates a cipher algorithm match, or terminating communication 218 if all cipher algorithms have been checked without finding a match.

By way of example and not intended to be limiting, consider the case where only two possible key generators designated KG1 and DES are included and the DES key generator is given preferred status in the event that both KG1 and DES are common to the two terminals. In this situation method 200 concludes the AD&C message exchange with one of four possible outcomes: (i) if no match is found between the two terminals, the call is terminated; (ii) if only the KG1 mode is common to the two terminals, the KG1 key generator is used; (iii) if only the DES key generator is common to the two terminals, the DES key generator is used, and (iv) if both the DES and the KG1 modes are common to both terminals, the DES key generator is used. Similar outcomes apply for longer lists of key generator capabilities, with the highest con, non preferred status key generator being chosen for continued communication. The order of preference of key generators may be preprogrammed into the terminals or transmitted as part of the A/D&C or other message.

The capabilities of the terminals are indicated by specific bytes or groups of (e.g., eight) bits, within an overall message. Specific bits of a specific byte are used to indicate a given capability according to a predetermined protocol. For example, the leading bit of the key generator capability byte can be chosen to represent a capability for a proprietary key generator, with the next bit chosen to represent a capability for a DES-type key generator. A similar convention can be employed for data rate capabilities, et cetera.

Figure 5:
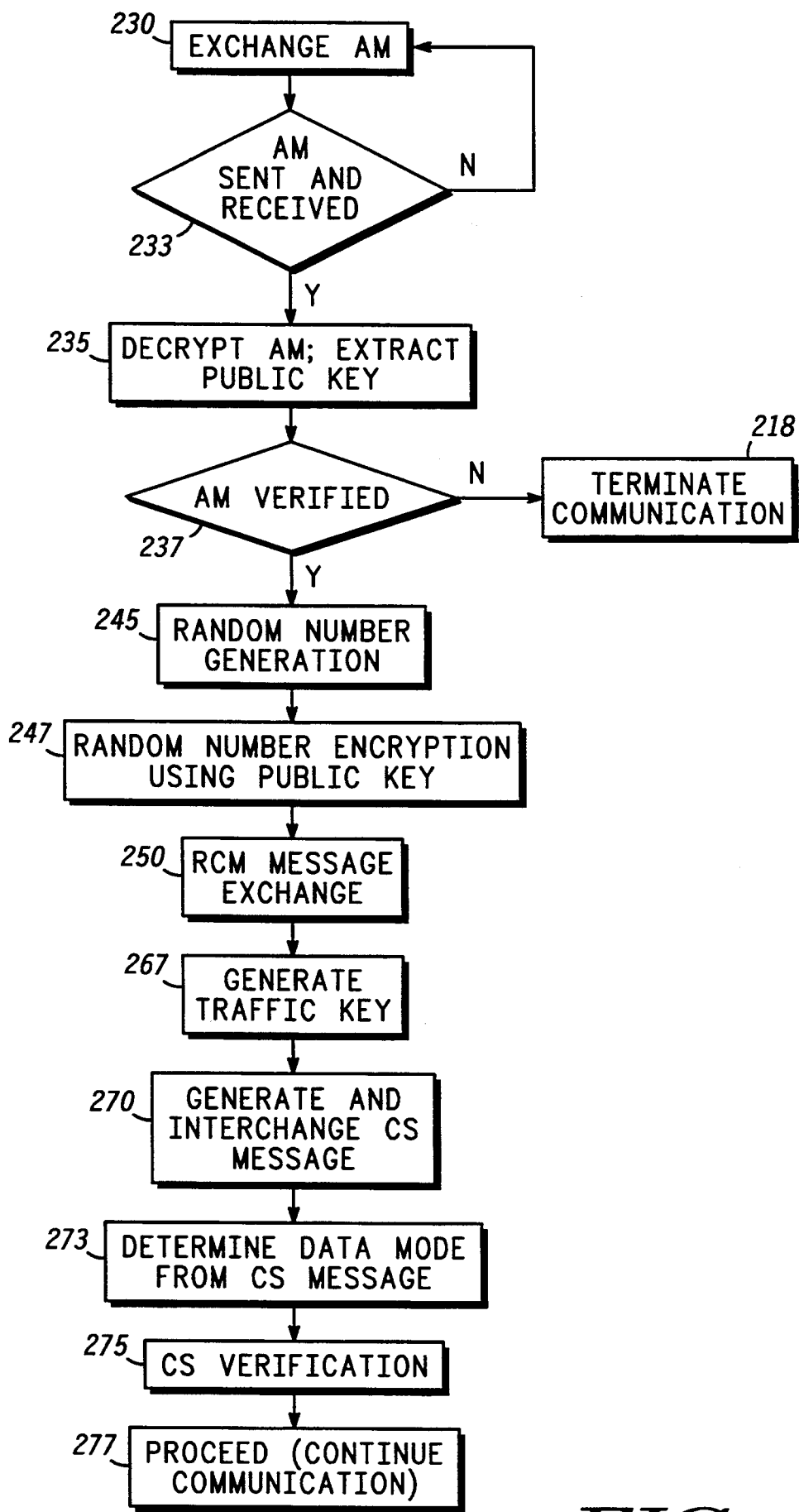
FIG. 5 is a flow chart illustrating further details of a portion of the message exchange of FIG. 3 for establishing secure communication in accordance with the preferred embodiment of the present invention.

FIG. 5 is a flow chart illustrating the exchange of second, third, and fourth messages 230, 250, 270 of FIG. 3 to determine validity of terminal credentials, setting up traffic keys and synchronizing the encryption/decryption process. The following steps are performed in accordance with the present invention: Authentication Message (AM) exchange 230, Random Component Message (RCM) exchange 250, and Cryptographic Synchronization (CS) Message exchange 270. Verification (block 275) is also desirable for establishing secure communication (block 277).

FIG. 5 comprises loop 230, 233, 235, 237 including steps of Authentication Message (AM) exchange (block 230), verification (block 233) of AM exchange, AM decryption and public key extraction (block 235), AM verification (block 237) and termination of communications 218 if AM verification fails. These steps are followed by steps of random number generation (block 245), random number encryption using, for example, public key cryptography (block 247), and Random Component Message exchange (block 250) and traffic key generation (block 267), Cryptographic Synchronization message generation and transmission (block 270), data mode determination (block 273), cryptographic synchronization verification (block 275) and continuation of communication (block 277).

AM exchange (block 230) provides information identifying certified user authentication information, the certified user public key, and the certified information expiration date. This message is processed using public key cryptography to encrypt and decrypt the message according to means well known in the art.

A random number is generated in each terminal (block 245) and sent to the other terminal after being encrypted, for example, using the public key received in the AM. Thus, each Random Component Message (RCM) exchanged (block 250) contains a random number, generated by the communications terminal originating the exchanged RCM. This random number should be of sufficient length to provide a traffic key for any of the key generators employed in the secure communications system. This first random number is also stored in the originating terminal and combined (block 267) with a second random number decrypted from a Random Component Message returned by the other terminal. The combined first and second random numbers form a third random number. Meanwhile, the same thing is happening in the other terminal wherein the received (first) random number is combined with the internally generated (second) random number to produce the same third random number. The third random number is used as a traffic key for the selected (block 221 of FIG. 4) key generator for both the terminals, and is loaded therein starting with the most significant bit. Any unused bits in the traffic key are discarded, allowing a single apparatus to generate varying traffic key lengths to accommodate the potentially differing requirements of a plurality of key generators within key management data base 210 (see FIG. 2). The first random number is encrypted (block 270) prior to incorporation into and exchange of RCM (block 250) by, for example, use of the certified user public key contained in the received Authentication Message (block 230). The same thing happens to the second random number coming from the other terminal. One method for combining the first and second random values (block 267) is modulo-two addition, readily implemented by exclusive-ORing the random numbers in a bit-wise fashion, as is well known in the art. However, other means and methods well known in the art for combining binary numbers may also be used.

Cryptographic Synchronization (CS) Message 270 delivers: traffic modality (voice, data, etc.) information, cryptographic information as required, and KG synch verification. A linear feedback shift register, or LFSR, (not shown) may be employed as a portion of the cryptographic apparatus. Linear feedback shift registers require a starting value or seed. The seed is an example of cryptographic information which may be required as a part of CS message 270. LFSR's are well known in the art.

A preferred method for KG synchronization verification is to transmit data which are an encrypted version of a known, or check, data pattern. These data are generated by loading an LFSR with a seed, synchronizing the transmit LFSR and transmit KG, and then encrypting the seed and the check pattern using the transmit LFSR and KG. When these received data are decrypted by the receiving secure communications terminal, the received seed is loaded into the receive LFSR and the check data pattern is compared to a stored version thereof. A match between these is indicative of cryptographic synchronization of the secure communications terminals.

These steps thus allow secure communications terminals having multiple cryptographic capabilities to automatically (i) select an appropriate cryptographic mode from a predetermined hierarchy of cryptographic modes, (ii) select a common data rate, (iii) carry out appropriate terminal identification and user authorization, (iv) exchange traffic keys via a public key or another method, and (v) effect cryptographic communications synchronization and verification.

The foregoing steps are carried out in a fashion which is largely operator transparent, increasing system security and requiring less knowledge of detailed cryptographic procedures and methods of the operator.

In the manual key management mode, the call setup sequence consists of the exchange of Access Domain and Capabilities (AD&C) Message 211 of FIGS. 3 and 4 and Cryptographic Synchronization (CS) message 270 of FIGS. 3 and 5.

Access Domain and Capabilities (AD&C) Message 211 of FIG. 4 provides information for determining which key management mode to employ, which KG algorithm to select, which traffic key within the manual key data base to use, and any additional terminal capabilities.

Cryptographic Synchronization message 270 exchange (FIG. 5) provides information specifying the traffic mode (voice, data, etc.), seed values for the linear feedback shift register and/or KG starting points, and also allows KG synchronization verification.

EXAMPLE

The following is an example of the means and method of the present invention. FIG. 6 illustrates an example of secure communications terminal 600 analogous to terminal 103 (and/or 109) wherein modem 610 communicates with telephone line or other communications system 605 and is connected to microprocessor controller 620. Microprocessor controller 620 is coupled to key management data base 630 and to key generators KG1 identified as 633 and KG identified as 637 (e.g., DES), switch 640, and voice or data link 645. Switch 640 determines which of key generators 633, 637 is employed to connect voice or data link 645 to microprocessor controller 620, modem 610, and communications system 605.

FIG. 7 illustrates KG capabilities byte 710 and modem rate capabilities byte 720 of AD&C message 211 (FIGS. 3 and 4), showing modalities for key generation, data rate and format supported by a given secure communications terminal 103, 109 (FIG. 1). In these examples, the unused bits are marked "RES" and are included with the used bits to form the complete capabilities bytes. The highest priority bit used is the leftmost one not marked "ES". In KG capabilities byte 710, the highest priority key generator is thus DES with KG1 being the next highest priority key generator. Similarly, data rate priorities may range from 96D (highest) to 48V (lowest), in accordance with standard data rates which are well known in the art.

A first step is the generation of AD&C message 211 (see FIGS. 3 and 4), built up of bytes such as 710, 720 of FIG. 7, describing capabilities of the machine originating AD&C message 211. AD&C messages are then exchanged (block 211, FIG. 2) and passed to microprocessor controller 620, wherein they are parsed as in steps 213, 216, 217, 219, 221, 222, 224 to determine corresponding capabilities between the two secure communications terminals. If a failure to determine correspondence occurs, communication is terminated (block 218). Matching results in communications proceeding (block 224).

For the case where only two possible key generators designated KG1 and DES are considered, with the DES key generator being given preferred status in the event that both are common to the two terminals (as illustrated in byte 710 of FIG. 7), AD&C message exchange (block 211) concludes with one of four possible outcomes as described earlier.

The initial modem rate is established by the secure terminal which initiates the call. The modem rate can be changed to another modem rate which is common to both secure terminals.

Microprocessor controller 620 (FIG. 6) then sends a first Authentication Message (AM) and receives a second AM (block 230 of FIG. 5) via modem 610. The received AM is processed (blocks 235, 237) to decrypt a public key and to verify the AM. If the AM is not verified the processor can re-try a predetermined number of times and if there is still a failure, terminate communication as in block 218 of FIG. 5.

Microprocessor controller 620 then employs one of the key generators KG1–KGN from key management data base 630 (analogous to 210 of FIG. 2) to generate (block 245, FIG. 5) a random number which is encrypted (block 247) using the public key decrypted (block 235) from the received AM. The encrypted random number and other data are combined to form a random component message (RCM) which is exchanged (block 250) via modem 610 for an RCM from the remote (other) secure communications terminal. The random number obtained from the received RCM is combined with the random number generated (block 245) earlier to form a traffic key for the key generator determined from the AD&C Message. The random numbers can be combined by adding them using modulo two arithmetic, an operation realized, as for example, by means of exclusive-ORing two binary numbers.

The resultant (third) random number is loaded into the KG selected by the AD&C message exchange (block 211), beginning with the most significant bit.

Microprocessor controller 620 generates another random number used as a seed for the transmit linear feedback shift register. A check pattern is encrypted and transmitted (block 270) as a portion of the CS message, which also contains seed(s) for the remote (other) terminal's receive LFSR and/or KG. The CS message (block 270) received from the remote terminal contains seeds to be used by the receive LFSR and/or KG of the first (originating) secure communications terminal. This is decrypted from the received CS message and is used to decrypt the received check pattern. A similar operation is being performed in the remote terminal. When the check pattern is properly decrypted (block 275) and verified against the stored data check pattern, secure communication of the desired message can proceed (block 277). In the event that decryption of the check pattern is not successful, the key generator is re-loaded with a random number and CS message exchange (block 270) is retried.

In a preferred embodiment of the present invention, microprocessor controller 620 comprises two Type 6303 micro-controller chips and a Type DSP 56001 high speed digital signal processing chip manufactured by Motorola, Inc., of Phoenix, Ariz. The first Type 6303 micro-controller handles all signal flow tasks, determining when each of the steps of FIGS. 4 and 5 occur, the second Type 6303 microprocessor chip determines the content of each individual message 211, 230, 250, 270, and the Type. DSP 56001 chip performs numerically intensive computations associated with encryption and decryption of, for example, public key encoded data and other similarly computationally involved tasks. A preferred embodiment of the modem function is Type V.26, or alternatively, Type V.32. Modems of these types are sold by Universal Data Systems, a subsidiary of Motorola, Inc., located in Huntsville, Ala. However, other modems or methods of communication can also be used.

Based on the foregoing description, it will be apparent to those of skill in the art that the present invention solves the problems and achieves the purposes set forth earlier, and has substantial advantages as pointed out herein, among other things, (1) allowing secure communication between differing types of secure data communications systems employing differing encryption algorithms, key variables and key variable lengths with a single apparatus containing multiple ciphering engines, (2) providing a predetermined hierarchy of algorithms, keys, communications modes, etc., for increased security, and (3) able to be transparent to the user. By providing these features in a single apparatus, the present invention minimizes power supply requirements and expense of equipment, and provides a compact form.

Another advantage of the present invention is that automation of secure information protocol and key variable exchange minimizes the need for detailed user knowledge of system operation. This simplifies operation of the secure communications terminal. Additionally, need for dissemination of information describing system operation is reduced, thus providing additional security by minimizing exposure of detailed system knowledge.

While the present invention has been described in terms of particular elements, structures and steps, these choices are for convenience of explanation and not intended to be limiting and, as those of skill in the art will understand based on the description herein, the present invention applies to other choices of elements, arrangements and process steps, and it is intended to include in the appended claims, these and other variations falling within the scope and spirit of the present invention as will occur to those of skill in the art based on the present disclosure.

What is claimed is:

1. A secure communications apparatus, comprising:
   signaling means for communicating with another communication apparatus;
   means for generating a first random number;
   memory means for at least temporarily storing data including said first random number;
   first ciphering means coupled to said signaling means and said random number generating means, said first ciphering means for encrypting said first random number to provide an encrypted first random number for transmission to said another communication apparatus, and for decrypting an encrypted second random number received from said another communication apparatus to recover a second random number;
   means for combining coupled to said memory means and first ciphering means, said combining means for combining said first and second random numbers to provide a third random number;
   second ciphering means coupled to said signaling means and said combining means, said second ciphering means for encrypting or decrypting messages using said third random number as a traffic key, said messages for transmission to or reception from said another communication apparatus by said signaling means; and
   means for automatically determining a data rate for communicating with another communications apparatus in response to messages exchanged between said secure communications apparatus and said another communications apparatus.

2. An apparatus as claimed in claim 1, wherein said first ciphering means is a public key ciphering means and said second ciphering means is a Data Encryption Standard (DES) ciphering means.

3. An apparatus as claimed in claim 1, wherein said first and second ciphering means comprise a computational apparatus responsive to stored programs for executing at least first and said second ciphering algorithms corresponding to said first and second ciphering means.

4. An apparatus as claimed in claim 3, wherein said first ciphering means uses a public key ciphering algorithm and said second means uses a non-public key ciphering algorithm.

5. An apparatus as claimed in claim 4, further comprising means for exchanging authentication messages with said another communication apparatus, said authentication messages including a public key, wherein said computational apparatus uses said public key for encrypting said first random number to produce said encrypted first random number.

6. An apparatus as claimed in claim 5, further comprising means for crypto synchronization for initiating exchange of encrypted messages with said another communication apparatus, including providing said encrypted messages using said third random number as a traffic key.

7. An apparatus as claimed in claim 6, wherein said crypto synchronization means comprises:
   means for encrypting and transmitting a predetermined data pattern, said predetermined data pattern known to said another communication apparatus; and
   means for decrypting and comparing a known data pattern received from said another communication terminal with another known data pattern stored in said memory means, wherein said another known data pattern is identical to said known data pattern.

8. An apparatus as claimed in claim 1, further comprising:
a plurality of cryptographic means including said first and said second ciphering means, wherein said first ciphering means is a public key ciphering means; and
means for determining in accordance with a preprogrammed hierarchy, which of said plurality of cryptographic means comprises said second ciphering means, said determining means operating in response to capabilities information describing said plurality of cryptographic means in said another communication apparatus, said capabilities information contained in capabilities messages exchanged between said secure communications apparatus and said another communication apparatus.

9. An apparatus for secure communications, comprising:
a plurality of different data ciphering means for encrypting input data to be transmitted and for decrypting received data to provide decrypted output data, some of said plurality of different data ciphering means requiring traffic keys of different lengths;
transceiver means coupled to said plurality of different data ciphering means, said transceiver means for exchanging encrypted data with another secure communication apparatus;
control means coupled to said transceiver means and said plurality of different data ciphering means, said control means for selecting a first of said plurality of different data ciphering means according to a predetermined preference hierarchy, said first of said plurality of different data ciphering means for encrypting and decrypting messages exchanged with said another secure communication apparatus, said control means creating a traffic key by combining data contained in said exchanged messages and selecting a second of said plurality of different data ciphering means for using said traffic key to exchange encrypted data with said another secure communication apparatus.

10. An apparatus as claimed in claim 9, wherein said first of said plurality of different data ciphering means is a public key encryption and decryption means whereby encrypted random numbers are exchanged with said another secure communication apparatus and wherein said exchanged encrypted random numbers are combined by said control means to form said traffic key.

11. An apparatus as claimed in claim 10, wherein said traffic key created by said control means has a length equal to or greater than a longest key required by any of said plurality of different data ciphering means.

12. An apparatus as claimed in claim 11, further comprising means for truncating said traffic key to match a key length required by said second of said plurality of different data ciphering means.

13. An apparatus as claimed in claim 10, wherein said control means and said public key encryption and decryption means comprise microprocessor means.

14. A secure communications apparatus for communicating with other secure communication apparatus, said secure communications apparatus comprising:
means for providing different encryption modes and communication modes;
means for sending a first capabilities message to and receiving a second capabilities message from said other secure communication apparatus, said first and said second capabilities messages having predetermined data fields identifying said different encryption modes and communication modes resident in said secure communication apparatus and in said other secure communication apparatus, said means for sending a first capabilities message and receiving a second capabilities message coupled to said means for providing different encryption modes and communication modes; and
means for comparing said first and said second capabilities messages to identify and select compatible encryption modes and compatible communication modes according to a stored preference protocol, said comparing means coupled to said means for sending a first capabilities message and receiving a second capabilities message.

15. An apparatus as claimed in claim 14, further including:
means for generating, encrypting and transmitting a first random number to said other secure communication apparatus, said means for generating, encrypting and transmitting coupled to said means for providing different encryption modes and communication modes;
means for receiving and decrypting a second random number from said other secure communication apparatus; and
means for combining said first and second random numbers to form a secure communication traffic key for use with said compatible encryption mode, said combining means coupled to said means for receiving and decrypting.

16. An apparatus as claimed in claim 14, further including:
means for sending a first authentication message, said first authentication message including a first public key encryption key, said first authentication message sending means coupled to said means for providing different encryption modes and communication modes;
means for receiving a second authentication message, said second authentication message including a second public key encryption key;
means for generating a first random number coupled to said means for providing different encryption modes and communication modes, wherein said means for providing different encryption modes and communication modes encrypts said first random number using said second public key encryption key and provides an encrypted random number; and
means for transmitting said encrypted random number, said transmitting means coupled to said means for providing different encryption modes and communication modes.

17. An apparatus as claimed in claim 16, wherein said first authentication message further includes a first expiration date for said first public key, and wherein said second authentication message further includes a second expiration date for said second public key.

18. An apparatus for establishing a secure communications link using any of several ciphering algorithms including in combination:
a plurality of means for ciphering utilizing different ciphering algorithms;

means for transmitting encrypted data, said transmitting means coupled to said plurality of ciphering means;

means for receiving encrypted data, said receiving means coupled to said plurality of ciphering means; and control means coupled to said plurality of ciphering means, said transmitting means and said receiving means, said control means for:

(i) automatically determining a data rate for communicating with another communications apparatus in response to unencrypted messages exchanged between said apparatus and said another communications apparatus; and (ii) automatically determining which of said plurality of ciphering means to employ for any given secure communication.

* * * * *

UNITED STATES PATENT AND TRADEMARK OFFICE
CERTIFICATE OF CORRECTION

PATENT NO. : 5,341,427
DATED : August 23, 1994
INVENTOR(S) : Douglas A. Hardy et al.

It is certified that error appears in the above-indentified patent and that said Letters Patent is hereby corrected as shown below:

On title page, item [*], change "The portion of the term of this patent subsequent to June 12, 2010 has been disclaimed." to --The portion of the term of this patent subsequent to October 16, 2011 has been disclaimed.--

Signed and Sealed this

Thirtieth Day of April, 1996

Attest:

BRUCE LEHMAN

*Attesting Officer*  *Commissioner of Patents and Trademarks*